(12) United States Patent
Kuo et al.

(10) Patent No.: US 8,575,806 B2
(45) Date of Patent: Nov. 5, 2013

(54) POWER GENERATING STRUCTURE WITH DUAL ARRAY OF MAGNETIC FIELDS

(76) Inventors: Chung-Yi Kuo, New Taipei (TW);
Shyh-Shiaw Lee, New Taipei (TW)

( * ) Notice: Subject to any disclaimer, the term of this patent is extended or adjusted under 35 U.S.C. 154(b) by 122 days.

(21) Appl. No.: 13/117,167

(22) Filed: May 27, 2011

(65) Prior Publication Data
US 2012/0299426 A1 Nov. 29, 2012

(51) Int. Cl.
*H02K 16/04* (2006.01)
*H02K 21/24* (2006.01)
*F03D 3/00* (2006.01)
*F03D 9/00* (2006.01)

(52) U.S. Cl.
USPC ............... 310/156.36; 310/156.37; 310/112; 310/114; 310/266; 310/268; 290/43; 290/44; 290/54; 290/55

(58) Field of Classification Search
USPC ............... 310/156.36, 156.37, 112, 114, 266, 310/268; 290/43, 44, 54, 55
IPC ...... H02K 16/04,21/24; H02P 9/00; F03D 3/00, F03D 9/00
See application file for complete search history.

(56) References Cited

U.S. PATENT DOCUMENTS

| | | | |
|---|---|---|---|
| 4,082,971 A * | 4/1978 | Miyake et al. | 310/114 |
| 4,605,873 A * | 8/1986 | Hahn | 310/154.06 |
| 6,455,969 B1 * | 9/2002 | Chen | 310/114 |
| 7,525,228 B2 * | 4/2009 | Chuang et al. | 310/112 |
| 7,701,103 B2 * | 4/2010 | Kurokawa | 310/179 |
| 7,808,142 B2 * | 10/2010 | Wise | 310/156.32 |
| 2006/0022552 A1 * | 2/2006 | Zhu et al. | 310/268 |
| 2007/0024147 A1 * | 2/2007 | Hirzel | 310/191 |
| 2010/0253085 A1 * | 10/2010 | Minowa et al. | 290/55 |

FOREIGN PATENT DOCUMENTS

GB WO2010040829 * 4/2010
* cited by examiner

*Primary Examiner* — Terrance Kenerly
(74) *Attorney, Agent, or Firm* — Leong C. Lei

(57) ABSTRACT

A power generating structure comprises a front magnetic disc, a rear magnetic disc, and a coil disc disposed between the front and the rear magnetic discs. The coil disc is provided with a plurality of coil units radially arranged. Each coil unit includes a plurality of coils each with different turns of insulated wire. The front and the rear magnetic discs are respectively provided with a plurality of magnetic elements radially arranged. The coil disc is fixed to a shaft at a center thereof. The shaft extends outwardly from the rear magnetic disc. A plurality of blades can be attached to a periphery of the front or the rear magnetic disc. Therefore, the blades can be driven to rotate the front and the rear magnetic discs to have the coils of coil units continuously induced different voltages by the magnetic elements to supply various equipment.

5 Claims, 6 Drawing Sheets

POWER GENERATING STRUCTURE WITH DUAL ARRAY OF MAGNETIC FIELDS

TECHNICAL FIELD OF THE INVENTION

The present invention relates to a power generating structure with dual array of magnetic fields and, more particularly, to a power generating structure with dual array of magnetic fields that can facilitate the fabrication, stabilize the operation, and generate power more effectively for the purpose of environmental protection.

DESCRIPTION OF THE PRIOR ART

Due to continuous energy consumption on earth, the green house effect has become even worse day after day, shortage of energy has become more serious than ever. Thus, every country strives to develop a plan for generating power in a natural way. In view of the method of current power generation, it includes fossil fuel power, hydraulic power, wind power, nuclear power, and so on. As to the fossil fuel power generation, it generates power by burning oil, which is not only related to the resources of earth but also a major cause of the green house effect, which has a connection with burning.

Regarding the hydraulic power generation, due to the requirement of appropriate areas for building reservoirs and installing multiple sets of generators, as well as water flow with a certain amount of impact force to drive the generators for power generation, the cost is high. Therefore, it is difficult to promote such technology Regarding the nuclear power generation, although it is a clean energy, the safety and nuclear pollution is controversial and always questioned by the environmentalists.

Regarding the wind power generation, the current power generating structure, which is in want of a high-rise tower and large blades installed on the top the power, is complicated in assembling the parts and inconvenient in construction. In practical applications, the wind power technology needs a certain strength of wind flow to rotate the blades for power generation. The cost is high and appropriate areas subject to wind all the year round are required to construct wind turbines. Such technology is inapplicable to areas of small wind.

In light of the foregoing, according to the long-term experiences of the power generation and after the constant endeavor in the research and experiment, the applicant has contrived a way to improve the power generation, by which the operation of power generation can be stabilized, the environmental problems resulted from energy consumption can be soften to achieve the purpose of environmental protection.

SUMMARY OF THE INVENTION

The primary object of the present invention is to provide a power generating structure with dual array of magnetic fields to facilitate the fabrication of power generating devices, stabilize the operation of power generation under any conditions of wind flow, and exploit wind power to achieve the best results.

The power generating structure comprises a front magnetic disc, a rear magnetic disc, and a coil disc disposed between the front magnetic disc and the rear magnetic disc; wherein the coil disc is provided with a plurality of coil units radially arranged thereon, each coil unit includes a plurality of coils each with different turns of insulated wire, the front magnetic discs and the rear magnetic discs are respectively provided with a plurality of magnetic elements radially arranged, which can be aligned or not, the coil disc is fixed to a shaft at a center thereof, the shaft extends outwardly from the rear magnetic disc after combination of the front magnetic disc and the rear magnetic disc, a plurality of blades can be attached to a periphery of the front magnetic disc or the rear magnetic disc; whereby, under a wind flow, the blacks can be driven to rotate the front and the rear magnetic discs to have the coils of coil units continuously induced different voltages by the magnetic elements to supply various equipment.

In the power generating structure, the front magnetic disc and the rear magnetic disc are respectively employed as a front cover and a rear cover. The magnetic elements of the front magnetic disc and the magnetic elements of the rear magnetic disc are respectively arranged on an inner surface of the respective disc.

DETAILED DESCRIPTION OF THE PREFERRED EMBODIMENTS

Figure 1:
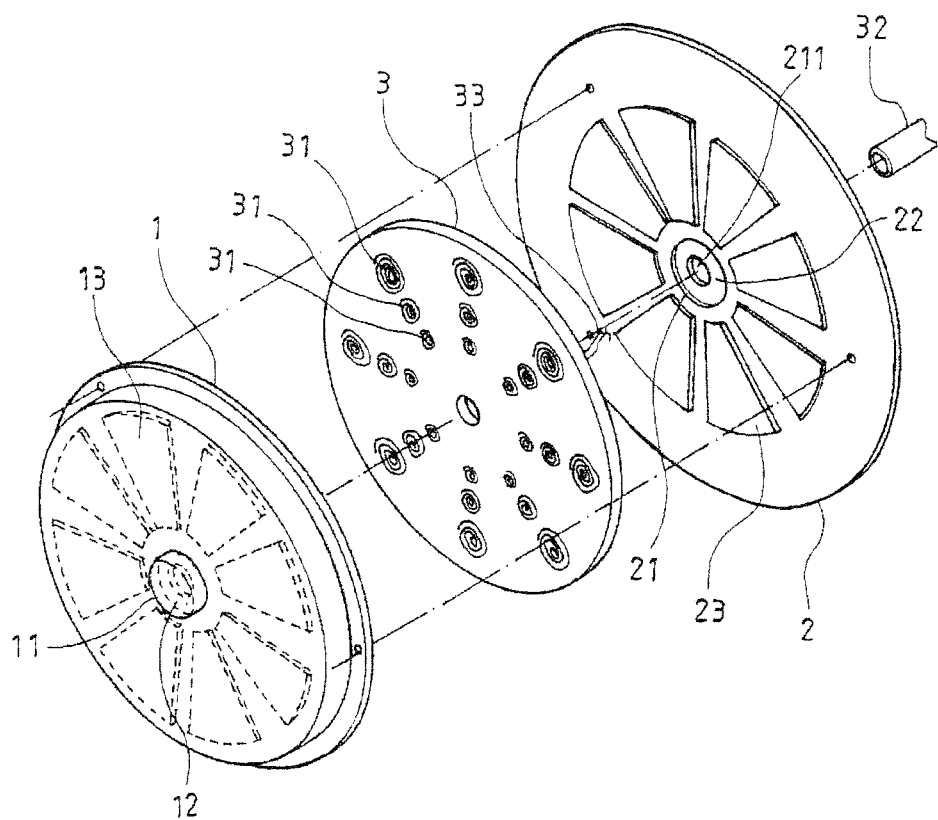
FIG. 1 is a 3-dimentional exploded view of the present invention.
Figure 2:
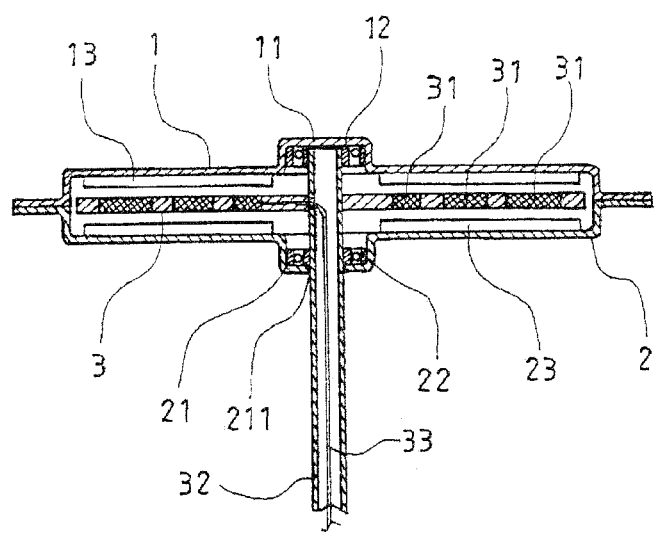
FIG. 2 is a sectional view of the present invention.
Figure 4:
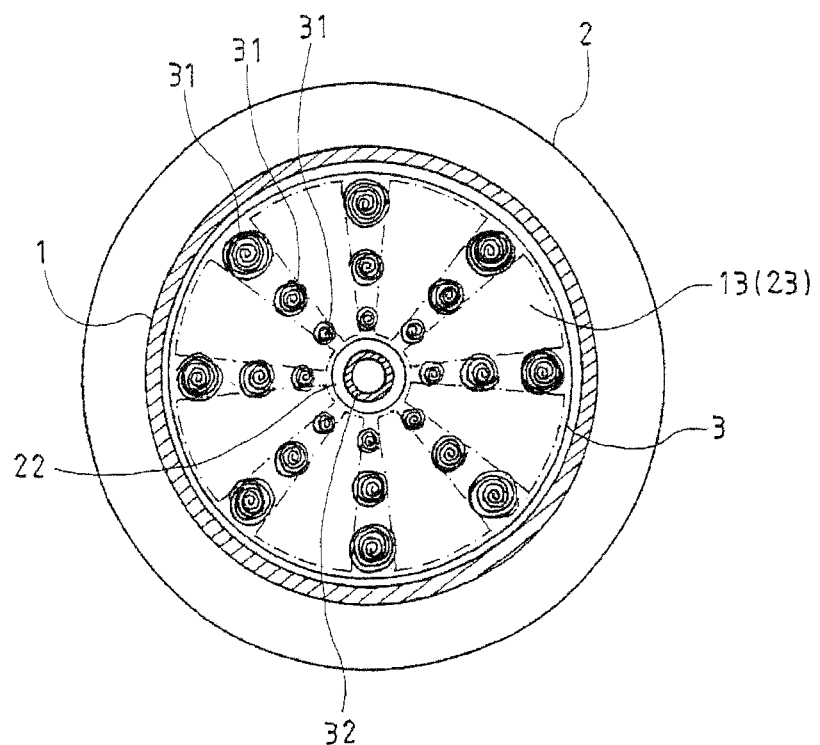
FIG. 4 is a plan view of the present invention

Please refer to FIG. 1 and FIG. 4, which are respectively an exploded view and a sectional view of the present invention. As shown, the present invention comprises a front magnetic disc 1, a rear magnetic disc 2, and a coil disc 3 disposed between the front magnetic disc 1 and the rear magnetic disc 2. In this embodiment, the front magnetic disc 1 and the rear magnetic disc 2 are respectively employed as a front cover and a rear cover. The front magnetic disc 1 is provided with a recessed hub 11 at a center thereof, in which a bearing 12 is fitted, and a plurality of magnetic elements 13 radially arranged on an inner surface thereof. The rear magnetic disc 2, corresponding to the front magnetic disc 1, is provided with a recessed hub 21 at a center thereof, in which a bearing 22 is fitted, and a plurality of magnetic elements 23 radially arranged on an inner surface thereof. A center hole 211 is defined at a center of the recessed hub 21.

The coil disc 3 is provided with one or more coil units radially arranged thereon. Each coil unit includes a plurality of coils 31. In this embodiment, three different sizes (large, medium, small) of coil are provided. As shown in FIGS. 1 and 4, each coil unit includes three coils 31, each of which have different turns of insulated wire. Furthermore, the coils that are more distant from the center of the coil disc 3 are provided with more turns of insulated wire. The coils that have a same distance from the center of the coil disc 3 are provided with same turns of insulated wire. Each coil 31 is connected to a pair of electrical wires of cable 33 that are in turn connected to a control circuit within a nacelle 5. The coil disc 3 is fixed to a shaft 32 at a center thereof, through which the cable 33 can be routed so as to connect with the control circuit within the nacelle 5.

In combination of the aforementioned components, the front magnetic disc 1, the rear magnetic disc 2, and the coil disc 3 are combined such that the front end of the shaft 32 fixed to the coil disc 3 is mounted in the bearing 12 of the front magnetic disc 1, the rear end of the shaft 32 is mounted in the bearing 22 fitted in the recessed hub 21 of the rear magnetic disc 2 and extends outwardly from the center hole 211, a plurality of blades can be attached to a periphery of the font magnetic disc 1 or the rear magnetic disc 2. When the blades are rotated by wind, the front magnetic disc 1 and the rear magnetic disc 2 can be driven to rotate to have the coils 31 of the coil units induced different voltages by the magnetic elements 13, 23.

The magnetic elements 13, 23 can be aligned or not, so as to produce a power output that can be worked with a full-wave rectifier for an application.

Figure 3:
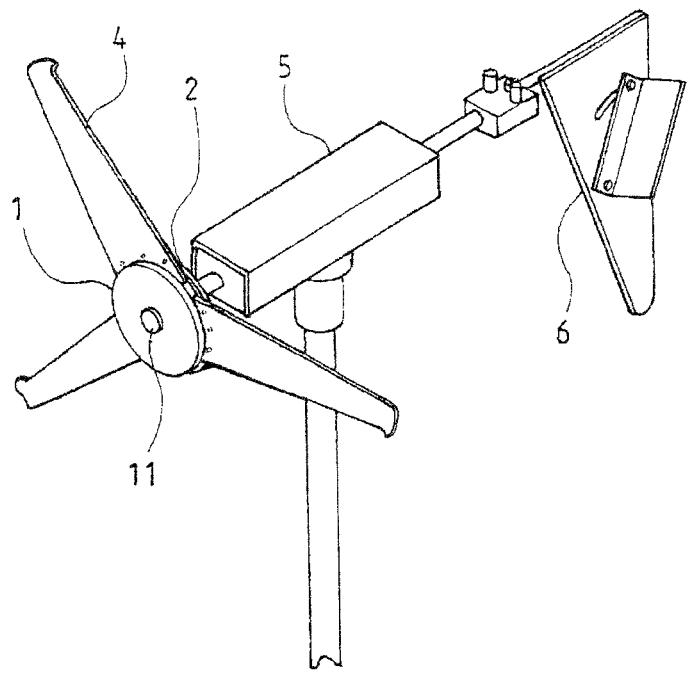
FIG. 3 is a 3-dimensional view of a wind-power generating device implementing the present invention.

Please refer to FIG. 3, which is a 3-dimensional view of a wind-power generating device implementing the present invention, in conjunction with FIG. 1. As shown, after a combination of the front magnetic disc 1, the rear magnetic disc 2, and the coil disc 3, the front magnetic disc 1 can be attached with a plurality of blades 4 at a periphery thereof, the shaft 32 can be mounted to the nacelle 5 such that the cables 33 of the coil disc 3 can connect with the control circuit within the nacelle 5, the nacelle 5 is attached with a vane 6 to be swung along wind direction, to thereby construct a wind-power generating device. Therefore, under a wind flow, the blades can be driven to rotate the front magnetic disc 1 and the rear magnetic disc 2 to have the coils 31 of coil units induced different voltages continuously via the magnetic elements 13, 23.

Please refer to FIG. 4, which is a plan view of the present invention, in conjunction with FIG. 3. As shown, the magnetic elements 13, 23 of the front and the rear magnetic discs 1, 2 are positioned corresponding to the coils 31 of the coil units of the coil disc 3, so that each coil 31 can be induced a voltage by the magnetic element 13, 23 when the front and the rear discs 1, 2 rotate. The coils 31 can be each manufactured with different turns of insulated wire. Since each coil 31 has different turns of insulated wire, the voltages induced in the coils 31 are different. As such, when wind flow is weak, the control circuit can be adjusted to allow the coils with fewer turns to supply electrical power; when wind flow is strong, the control circuit can be adjusted to allow the coils with more turns to supply electrical power, so that the wind-power generating device can be operated more effectively. For example, the coils 31 can be manufactured to be induced voltages of 6V, 9V, and 12V according to their turns of insulated wire. In application, when the front and the rear magnetic discs 1, 2 are rotated to have a greater speed by a stronger wind, the voltage of 9V and 12V can be selected to constitute a circuit to supply power. Furthermore, in operation, the coils 31 can be connected in multi-phase via the control circuit, or the coils 31 at the same phase (i.e. in the same radial line of the coil disc 3) can be connected in series via the control circuit for an application. Thus, the power generation will become more efficient.

Figure 5:
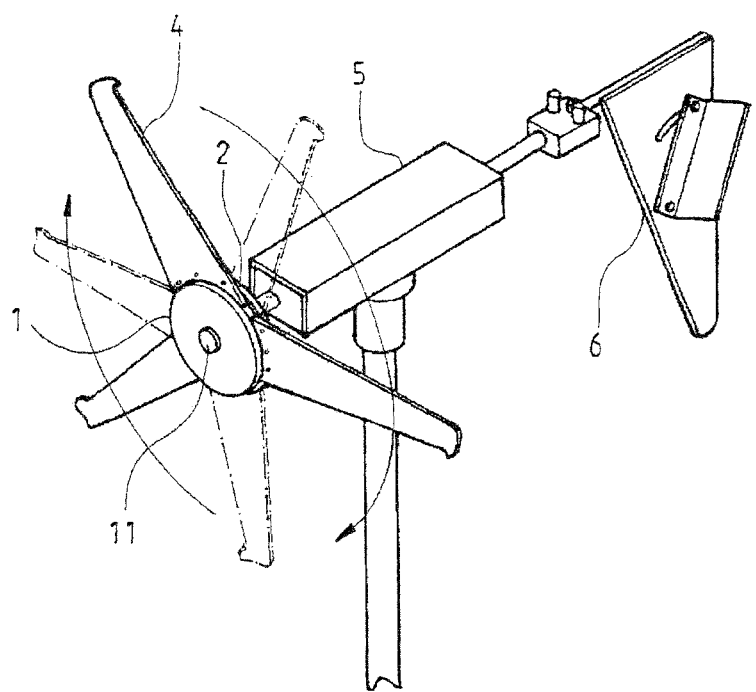
FIG. 5 is a view of an operational embodiment of the wind-power generating device implementing the present invention.
Figure 6:
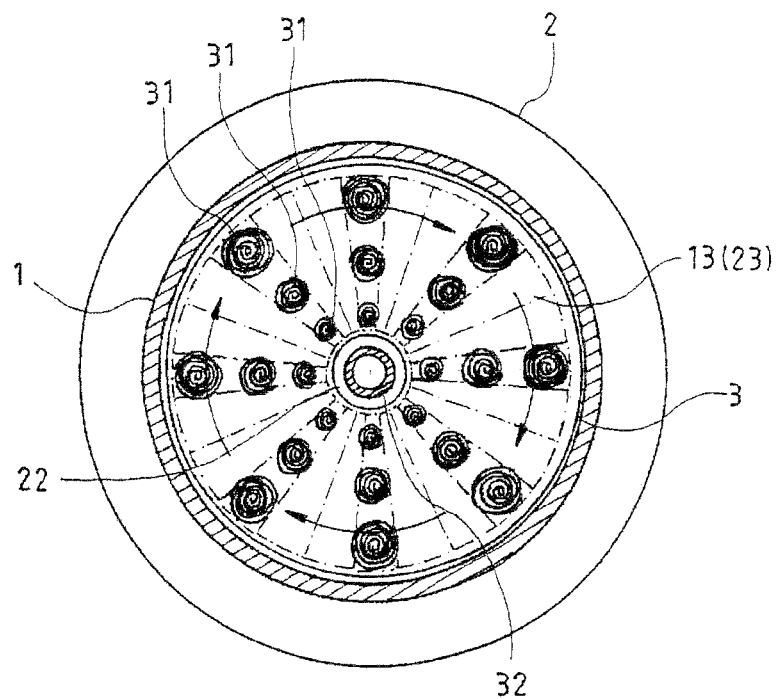
FIG. 6 is a view of an operational embodiment of the present invention.

Please refer to FIG. 5 in conjunction with FIG. 6, which are respectively a view of an operational embodiment of the wind-power generating device implementing the present invention and a view of an operational embodiment of the present invention. As shown, in operation, the entire wind power device is placed in a suitable site subject to wind flow. When the blades 4 are rotated due to the impingement of wind, the front and the rear magnetic discs 1, 2 can be rotated to have the coils 31 induced different voltages by the magnetic elements 13, 23. Furthermore, the vane 6 can be swung to align with a wind flow, such that the blades are always in the most ideal position facing the wind to achieve the best results of power generation.

The foregoing embodiments are only for illustrating a preferred way of implementing the present invention, rather than limiting the scope of the present invention. Any slight modification, change may be resorted to without losing the essence and spirit of the present invention.

In light of the forgoing, the present invention employs several coils of various turns in cooperation with the corresponding magnetic elements to compose a power-generating structure with dual array of magnetic fields to facilitate the wind power generation stabilize the operation of power generation under any conditions of wind flow, and exploit wind power to achieve the best results. It is believed that the present invention is a useful design with novel features. An early and favorable action is respectfully solicited.

We claim:

1. A power-generating structure with dual array of magnetic fields, comprising a front magnetic disc, a rear magnetic disc, and a coil disc disposed between said front magnetic disc and said rear magnetic disc; wherein said front magnetic disc and said rear magnetic disc are respectively provided with a plurality of magnetic elements radially arranged on an inner surface thereof, said coil disc is provided with one or more coil units radially arranged thereon, each coil unit includes a plurality of coils each with different turns of insulated wire, said coil disc is fixed to a shaft at a center thereof, said shaft has a front end fitted in said front magnetic disc and a rear end extends outwardly from said rear magnetic disc, a plurality of blades are attached to said front magnetic disc or said rear magnetic disc, wherein the coils that are more distant from the center of said coil disc are provided with more turns of insulated wire, the coils that have a same distance from the center of said coil disc are provided with same turns of insulated wire, each coil is connected to a pair of electrical wires of a cable that are in turn connected to a control circuit within a nacelle of a wind-power generating device; whereby said blades can be driven by wind to rotate said front magnetic disc and said rear magnetic disc to have said coils of said coil units continuously induced different voltages by said magnetic elements; when wind flow is weak, the control circuit can be adjusted to allow the coils with fewer turns of insulated wire to supply electrical power; when wind flow is strong, the control circuit can be adjusted to allow the coils with more turns of insulated wire to supply electrical power, so that the wind-power generating device can be operated more effectively.

2. The power generating structure as claimed in claim 1, wherein said front magnetic disc and said rear magnetic disc are respectively employed as a front cover and a rear cover.

3. The power generating structure as claimed in claim 1, wherein said magnetic elements of said front magnetic disc and said rear magnetic disc can be aligned or not, so as to produce a power output.

4. The power generating structure as claimed in claim 1, wherein said front magnetic disc is provided with a recessed hub at a center thereof, said recessed hub being fitted with a bearing to mount said front end of said shaft fixed to a center of said coil disc.

5. The power generating structure as claimed in claim 1, wherein said rear magnetic disc is provided with a recessed hub at a center thereof, said recessed hub of said rear magnetic disc defining a center hole and being fitted with a bearing, said shaft extends outwardly from said bearing of said rear magnetic disc and said center hole.

* * * * *